US008291015B2

(12) United States Patent
Stephens, Jr.

(10) Patent No.: US 8,291,015 B2
(45) Date of Patent: Oct. 16, 2012

(54) SYSTEM AND METHOD FOR MODELING VIDEO NETWORK RELIABILITY

(75) Inventor: James H. Stephens, Jr., Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 2929 days.

(21) Appl. No.: 10/045,303

(22) Filed: Oct. 29, 2001

(65) Prior Publication Data

US 2003/0084102 A1 May 1, 2003

(51) Int. Cl.
*G06F 15/16* (2006.01)
*G06F 12/173* (2006.01)
*G06F 17/00* (2006.01)
(52) U.S. Cl. ............................ 709/204; 709/223; 706/59
(58) Field of Classification Search .................. 709/204; 715/719–722, 753
See application file for complete search history.

(56) References Cited

U.S. PATENT DOCUMENTS

| | | | | |
|---|---|---|---|---|
| 5,692,107 A | | 11/1997 | Simoudis et al. ............... | 395/50 |
| 5,694,524 A | * | 12/1997 | Evans ............................ | 706/12 |
| 6,330,586 B1 | * | 12/2001 | Yates et al. .................... | 709/201 |
| 6,505,244 B1 | * | 1/2003 | Natarajan et al. ............. | 709/223 |
| 7,171,475 B2 | * | 1/2007 | Weisman et al. ............. | 709/227 |

OTHER PUBLICATIONS

Webpage entitled "Building Classification Models: ID3 and C4.5", at internet <http://yoda.cis.temple.edu:8080/UGAIWWW/lectures/C45>, Printed Oct. 9, 2001.

* cited by examiner

*Primary Examiner* — Peling Shaw
(74) *Attorney, Agent, or Firm* — Oblon, Spivak, McClelland, Maier & Neustadt, L.L.P.

(57) ABSTRACT

A program product for modeling video network reliability includes a computer-usable medium that encodes computer instructions. The computer instructions cause a data processing system to perform modeling operations. Those operations include obtaining historical data for multiple video conferences, and executing a modeling algorithm that produces a model representing the historical data. The model can be analyzed to identify opportunities for improving reliability of a video network. In an example embodiment, the computer instructions output results that a user can use reconfigure the video network for improved reliability. In another embodiment, the computer instructions analyze the model to identify opportunities for improving reliability of the video network, and the computer instructions automatically reconfigure the video network, based on the identified opportunities. The modeling algorithm may be a decision tree algorithm, such as the ID3-based algorithm known as C4.5.

17 Claims, 4 Drawing Sheets

CALL HISTORY TABLE

| CALL-ID | FROM-SUBNET | FROM-ENDPOINT | FROM-VENDOR | FROM-MODEL | GATEWAY | TO-SUBNET | TO-ENDPOINT | TO-VENDOR | TO-MODEL | MCU | LINE-SPEED | START-DATE | START-DAY | START-HOUR | DURATION | OUTCOME |
|---|---|---|---|---|---|---|---|---|---|---|---|---|---|---|---|---|
| C1 | 12A | 14A | VTEL | GALAXY | 18 | 12B | 14C | ILLUDIUM | Q-36 | TRUE | 256Kbps | 2001-10-12 | FRIDAY | 10 | 0:01:45 | 2 |
| C2 | 12A | 14A | VTEL | GALAXY | 18 | 12B | 14C | ILLUDIUM | Q-36 | TRUE | 512Kbps | 2001-10-13 | SATURDAY | 10 | 0:20:00 | 12 |
| C3 | 12B | 14C | ILLUDIUM | Q-36 | 18 | 12A | 14A | VTEL | GALAXY | TRUE | 256Kbps | 2001-10-16 | TUESDAY | 12 | 2:00:00 | 0 |
| C4 | 40 | 50 | VTEL | GALAXY | 52 | 42 | 54 | ILLUDIUM | Q-36 | TRUE | 256Kbps | 2001-10-16 | TUESDAY | 16 | 1:10:00 | 0 |
| C5 | 12B | 14C | ILLUDIUM | Q-36 | 18 | 12A | 14A | VTEL | GALAXY | FALSE | 512Kbps | 2001-10-19 | FRIDAY | 9 | 0:01:50 | 2 |
| ... | ... | ... | ... | ... | ... | ... | ... | ... | ... | ... | ... | ... | ... | ... | ... | ... |

| RULE 1: | TO-MODEL=Q-36 | & | MCU=TRUE | → | CLASS/=0 [70.7%] |
| RULE 2: | FROM-VENDOR=VTEL | & | TO-VENDOR=ILLUDIUM | → | CLASS/=0 [63.0%] |

FIG. 5

PROPOSED CALL

| FROM-SUBNET | FROM-ENDPOINT | FROM-VENDOR | FROM-MODEL | MCU | GATEWAY | TO-SUBNET | TO-ENDPOINT | START-DATE | START-DAY | START-HOUR | DURATION |
|---|---|---|---|---|---|---|---|---|---|---|---|
| 12A | 14A | VTEL | GALAXY | FALSE | 18 | 12B | 14C | 2001-10-22 | MONDAY | 10 | 2:00:00 |

| TO-VENDOR | TO-MODEL | LINE-SPEED |
|---|---|---|
| POLYCOM | VIA VIDEO | 256kbps |

# SYSTEM AND METHOD FOR MODELING VIDEO NETWORK RELIABILITY

TECHNICAL FIELD OF THE INVENTION

This invention relates in general to video network communications. In particular, the invention relates to a system and method for modeling video network reliability.

BACKGROUND OF THE INVENTION

Video conference calls have grown in popularity as the expense of video conferencing devices has decreased and the availability of broadband communication networks has increased. Businesses often prefer the more personal communication available through video conferences, compared with telephone conferences, and also enjoy savings in travel costs while still having a personal presence among the participants that is not possible with audio only communications. The increased popularity of video conferencing has resulted in the deployment of video network devices in wide ranging disparate locations, with the devices interfaced by business networks and/or public networks.

Often, video calls involve the interfacing of video network devices manufactured by a variety of different manufacturers and using a variety of protocols and network communication interfaces. For instance, a single video network might include video endpoints, multi-point control units (MCUs), and gateways manufactured by different manufacturers and using different communication protocols and interfaces. In addition, video data traverses router, switches, PBX's, and other non-video equipment. Each of these devices may include specific management, maintenance, and monitoring requirements that make reliable operation of the network difficult to realize.

One difficulty with managing video networks is determining which combinations of equipment and operational attributes are likely to interoperate successfully and which combinations are not. In complex video networks, such as those which include equipment from different vendors, attempts to conduct video conference frequently fail. For example, it is not unusual to experience technical difficulty in over thirty percent of all attempted video conferences involving three or more endpoints.

Conventionally, video network administrators have relied primarily on personal experience and intuition when troubleshooting problems in video networks and when attempting to configure specific video calls within a video network. As video networks are become increasingly complex, however, such administrative practices becoming ever more inadequate to the task of providing reliable video networks. And as businesses, governments, universities, and other consumers increase their dependence on video networks as a medium of communication, the reliability of the video networks becomes ever more important.

Therefore, as recognized by the present invention, a need exists for more effective means for identifying opportunities to improve video network reliability. For instance, it would be beneficial to provide more effective guidance for diagnosing problems in video networks. It would also be beneficial to provide more effective guidance in the process of configuring video networks for specific video calls.

SUMMARY OF THE INVENTION

The present invention involves a method, a system, and a program product that model video network reliability to help improve video network reliability. The program product includes a computer-usable medium encoding computer instructions which cause a data processing system to perform modeling operations. Those operations include obtaining historical data for multiple video conferences and executing a modeling algorithm that produces a model representing the historical data. A predetermined modeling algorithm may be used, or the modeling algorithm may be selected from a set of algorithms. The modeling algorithms may include decision tree algorithms (e.g., ID3-based algorithms like C4.5), neural network algorithms, Bayesian network algorithms, radial-based function algorithms, etc. The model can be analyzed to identify one or more opportunities for improving reliability of a video network.

In an example embodiment, the computer instructions output results that reveal opportunities for improving reliability of the video network. A user can reconfigure the video network for improved reliability, based on the results. In another embodiment, the computer instructions analyze the model to identify opportunities for improving reliability of the video network, and the computer instructions automatically reconfigure the video network for improved reliability, based on the identified opportunities.

Consequently, the present invention is frequently able to recognize important characteristics for improving video network reliability that might go unnoticed if less formal diagnostic techniques were used. In certain embodiments, analyses of historical data provide results which more effectively guide administrators in configuring video network for specific video calls. Additional technical advantages provided by various embodiments of the invention will become apparent upon review of the following material, which includes a detailed description of an example embodiment of the invention.

BRIEF DESCRIPTION OF THE DRAWINGS

Additional features, functions, and technical advantages will become apparent upon review of the following description, claims, and figures, in which:

FIG. 3 depicts an example call history relating to the video network of FIG. 1;

FIG. 4 depicts example rules derived from a model based on a hypothetical call history;

FIG. 5 depicts example attributes for a proposed call; and

DETAILED DESCRIPTION

Figure 1:
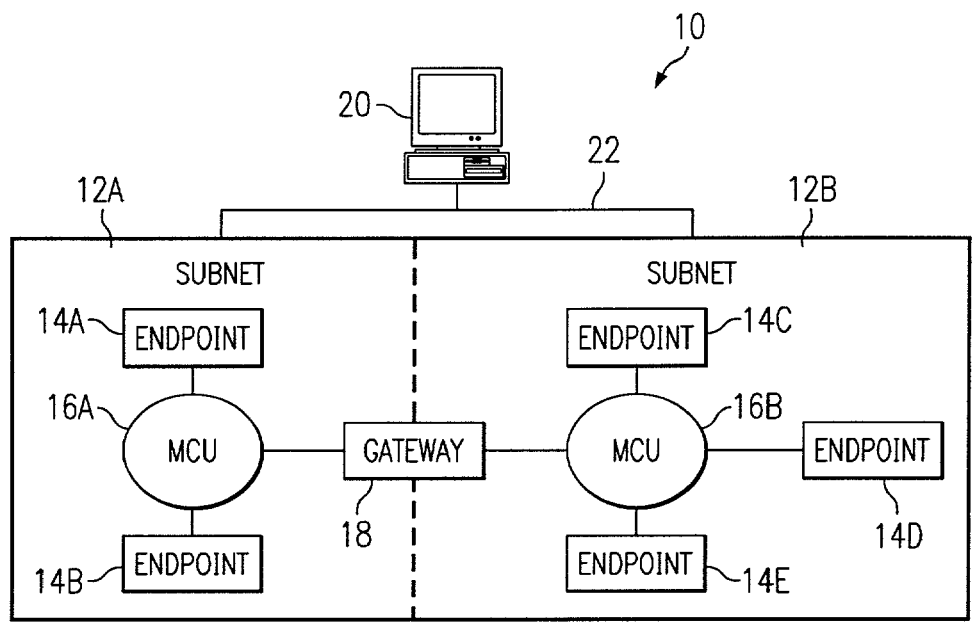
FIG. 1 presents a block diagram of an example embodiment of a video network.

Referring now to FIG. 1, an example embodiment of a video network 10 includes a subnet 12A, a subnet 12B, and an administrative workstation 20 which communicates with subnets 12A and 12B via an administrative connection 22. Subnet 12A includes two endpoints 14A and 14B and a multipoint control unit (MCU) 16A. Endpoints 14A and 14B each include a camera for capturing video images, a microphone for capturing audio, and output devices such as video displays and speakers for presenting output such as video and audio captured from a remote source. MCU 16A receives input from endpoints 14A and 14B for transmission to a remote location. MCU 16A also receives audio and video data from a remote location and forwards that data to endpoints 14A and 14B. Similarly, subnet 12B includes an MCU 16B, as well as three endpoints 14C, 14D, and 14E, and subnet 12B operates in a manner generally similar to subnet 12A.

Workstation 20 communicates via SNMP, HTTP, and other IP-based protocols over the administrative connection 22. Workstation 20 communicates with video and network devices to establish, monitor, and manage video conferences. For example, workstation 20 can monitor video jitter by polling certain video devices. Also, workstation 20 can listen for SNMP traps and other asynchronous notifications from devices.

In the example embodiment, subnets 12A and 12B use different communications standards, and gateway 18 serves as a bridge between subnets 12A and 12B, converting data between the different standards as necessary to support intercommunication. For instance, the equipment within subnet 12A may communicate using the International Telecommunication Union (ITU) Telecommunications Standardization Sector (TSS) H.320 standards for videoconferencing over circuit-switched networks, such as Integrated Services Digital Network (ISDN) or switched 5G. By contrast, the equipment in subnet 12B may communicate using the more recent ITU-TSS H.323 standards for videoconferencing and multimedia communications over packet-switched networks, such as Ethernet, Asynchronous Transfer Mode (ATM), and Frame Relay networks. The networks can include local area networks (LAN's) and wide-area networks (WAN's). Furthermore, within each subnet, the devices may have been manufactured by different vendors, and each may utilize a different protocol and/or a different physical communication interface. Even a single device may speak multiple protocols.

Figure 6:
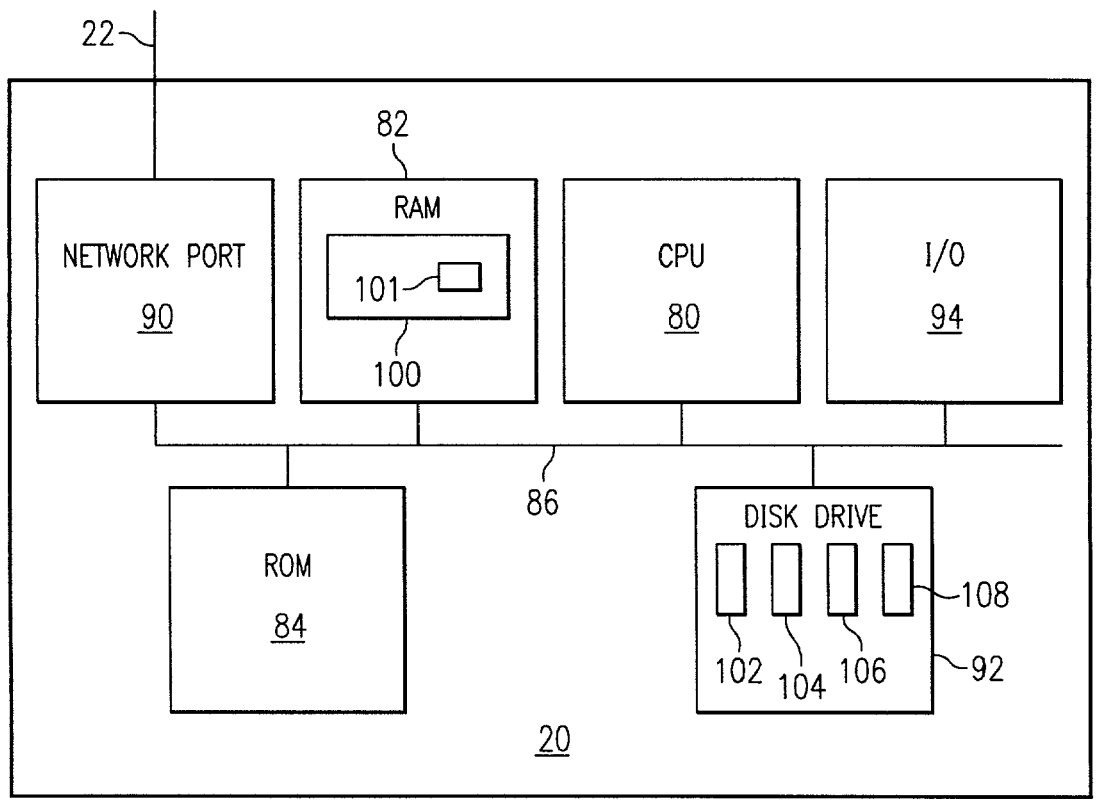
FIG. 6 presents a more detailed block diagram of the administrative workstation of FIG. 1.

Referring now to FIG. 6, administrative workstation 20 includes hardware and software for modeling the reliability of video network 10 to identify opportunities for improving the reliability of video network 10. Administrative workstation 20 may be a personal computer or other suitable device. In the example embodiment, administrative workstation 20 includes random access memory (RAM) 82, one or more central processing units (CPUs) 80, ROM 84, one or more disk drives 92, and/or other types of nonvolatile memory. Additional components include a network port 90 for communicating with external devices, such as the equipment in subnets 12A and 12B, as well as various input and output (I/O) devices 94, such as a keyboard, a mouse, and a video display. One or more buses 86 carry communications between the various hardware components. The hardware in workstation 20 may be referred to generally as processing resources.

The software in administrative workstation 20 includes a tuning application 100 with one or more modeling algorithms 101 for generating models from input data. Administrative workstation 20 may store tuning application 100 locally on nonvolatile memory and may load some or all of tuning application 100 into RAM 82 in preparation for execution. In addition, performance data for video network 10 may be stored in a call-history table 102 on disk drive 92. Alternatively, some or all of the computer instructions and/or data for tuning application 100 may be stored remotely and retrieved as needed, for example from a LAN, a wide area network (WAN), the Internet, etc.

In the example embodiment, call-history table 102 contains multiple call-history records 32, with each record providing information about the equipment, configuration parameters, and other attributes of a specific video call, as illustrated in FIG. 3. Specifically, each record includes data for some or all of the following fields:

a From-ID field that provides a unique identifier for each video call;

a From-Subnet field that identifies the originating subnet;
a From-Endpoint field that identifies the originating endpoint;
a From-Vendor field that identifies the vendor of the endpoint from which the video call originated;
a From-Model field which identifies the model of the originating endpoint;
a Gateway field which identifies a gateway used to bridge the originating subnet and a destination subnet;
a To-Subnet field which identifies the destination subnet;
a To-Endpoint field which identifies the destination endpoint;
a To-Vendor field which identifies the vendor of the destination endpoint;
a To-Model field which identifies the model of the destination endpoint;
an MCU field which indicates whether or not an MCU was used for the video call;
a Line-Speed field which identifies the requested transmission rate for the video call;
a Start-Date field which identifies the call-origination date;
a Start-Day field which identifies the weekday for the call-origination date;
a Start-Hour field which identifies the call-origination hour;
a Duration field which identifies the duration of the call; and
an Outcome field which indicates whether the video call was successful and, if not, what type of technical difficulty was experienced. Outcome values of zero indicate successful calls, whereas non-zero Outcome values represent different kinds of errors.

Tuning application 100 also includes computer instructions which, when executed, cause administrative workstation 20 to perform operations for modeling and tuning video network 10.

Figure 2:
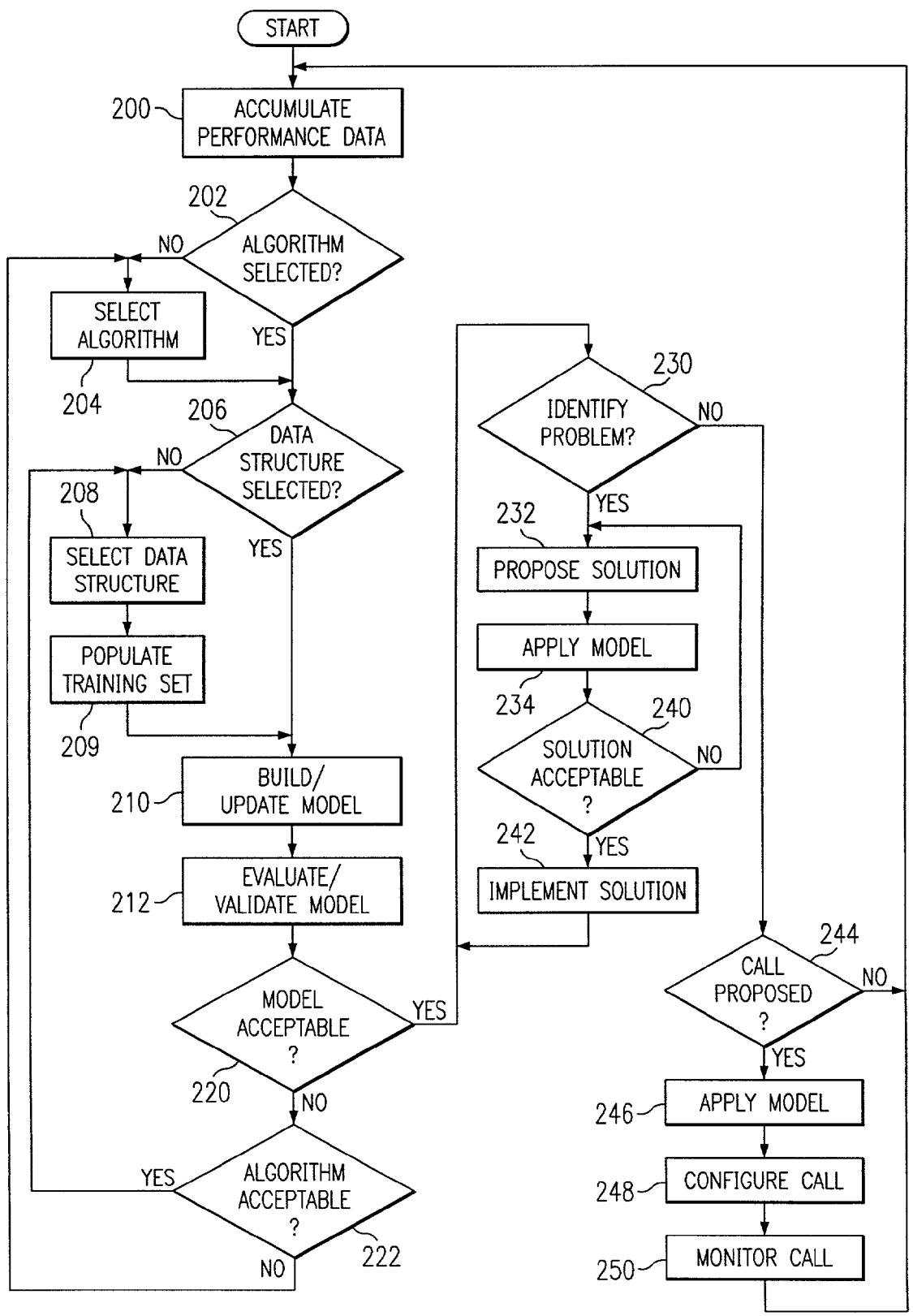
FIG. 2 presents a flowchart of an example embodiment of a method for modeling video network reliability.

With reference now to FIG. 2, a flowchart is provided to depict some of the operations performed by tuning application 100 in administrative workstation 20. In the example embodiment, the process illustrated in FIG. 2 begins with administrative workstation 20 having already populated call-history table 102 with performance data relating to the reliability of video network 10, as shown at block 200. As indicated at block 202, administrative workstation 20 then determines whether or not a modeling algorithm 101 has been selected. If not, a modeling algorithm 101 is selected, as indicated at block 204. For example, administrative workstation 20 may prompt an administrator to select a modeling algorithm, or administrative workstation 20 may automatically select an algorithm. Once a modeling algorithm 101 has been selected, administrative workstation 20 then determines whether or not a data structure for the training set 104 has been selected, as shown at block 206.

Training set 104 is the collection of data that will be used as input to modeling algorithm 101 to produce a model. The data structure for the training set 104 may or may not match the data structure used for the performance data in call-history table 102. If no data structure has been selected, workstation 20 automatically selects a data structure for training set 104 or prompts an administrator to select a data structure, as depicted at block 208. Once the data structure has been selected, administrative workstation 20 then populates training set 104 with performance data from call-history table 102, as shown as block 209.

As indicated at block 210, administrative workstation 20 then applies modeling algorithm 101 to training set 104 to create a model 106. As shown at block 212, model 106 is then evaluated to determine whether model 106 provides meaningful assistance in identifying opportunities for improving the reliability of video network 10.

For example, administrative workstation 20 may derive a rule set 108 from model 106, and rule set 108 may be analyzed in an attempt to identify opportunities for improving reliability. Analysis of rule set 108 may be performed by an administrator, or the analysis may be performed automatically by administrative workstation 20. As indicated at block 220, if model 106 is not found to be acceptable, the process passes to block 222, where a determination is made whether or not modeling algorithm 101 is acceptable. That determination may be made automatically by administrative workstation 20, or workstation 20 may prompt an administrator for that determination. If the algorithm is determined to be unacceptable, a new algorithm is selected, as shown in block 204, and the process passes through block 206 to block 210, which shows administrative workstation 20 generating a new model 106 with the newly selected modeling algorithm 101.

For instance, administrative workstation 20 may include a variety of modeling algorithms, including one or more ID3-based algorithms, such as C4.5, and administrative workstation 20 may loop through the different algorithms until an acceptable model is found. If necessary, training set 104 may also be regenerated, to provide input data that corresponds to the requirements of the selected modeling algorithm 101.

However, referring again to block 222, if the algorithm is deemed acceptable, a new data structure is selected and a new training set 104 is built using that data structure, as indicated at blocks 208 and 209. A new model 106 is then created from the new training set 104, using the old modeling algorithm 101, as shown in block 210. The new model 106 is then evaluated, as shown at blocks 212 and 220, as described above.

Once an acceptable model 106 has been generated, the process passes from block 220 to block 230, which shows an administrator determining whether the results of the modeling operations identify a specific problem in video network 10. For example, with reference to FIG. 4, the results of the modeling operations may include rule set 108, and rule set 108 may indicate that certain combinations of attributes frequently lead to technical difficulties in video calls. For instance, Rule 1 in FIG. 4 indicates that when the To-Model is a Q-36 endpoint and an MCU is used for the video call, technical difficulties are experienced 70.7% of the time. Rule 2 indicates that when the vendor of the originating endpoint is VTEL and the vendor of the destination endpoint is Illudium, 63% of calls have been unsuccessful. Rules 1 and 2 thus identify characteristics associated with undesirable outcomes (i.e., problems) in video network 10.

Referring again to FIG. 2, if a problem is identified, a solution is then proposed, as shown in block 232. For example, the administrator may propose using a different model of endpoint to originate video calls in the future. As shown in block 234, the proposed solution is then applied to model 106. For example, model 106 may be a decision tree 106, and the attributes of the proposed solution may be used to traverse decision tree 106 to arrive at a likely outcome. As depicted at block 240, if the outcome for the proposed solution is likely to be unsuccessful, the process returns to block 232, and a new solution is proposed. However, if the solution is acceptable, the process passes from block 240 to block 242, and the proposed solution is implemented. For example, the administrator may physically or electronically reconfigure video network 10 to incorporate the proposed solution.

The process then returns to block 230, and the results of the modeling operations are examined to identify any additional opportunities for improving the reliability of video network 10. If additional problems are identified, solutions are proposed and evaluated as described above. If no additional problems are identified, the process passes from block 230 to block 244, which depicts a determination of whether a specific call has been proposed for some future time. If no calls have been proposed, the process returns to block 200 with administrative workstation 20 accumulating performance data for video calls as those calls are conducted in video network 10.

However, if a call has been proposed, the process passes from block 244 to block 246, and the proposed call is applied to model 106 to identify a call configuration that is likely to lead to a successful outcome. For example, with reference to FIG. 5, a proposed call may be identified by a record that includes fields for known characteristics of the proposed call. Those characteristics may include a From-Subnet, a From-Endpoint, a To-Subnet, a To-Endpoint, whether an MCU will be required, etc. The attributes of the proposed call may be used to traverse model 106 to identify a call configuration with a high probability of success.

As indicated at block 248, video network 10 is then configured according to the results of the above analysis. The call is then conducted and monitored to identify whether or not the outcome of the call was successful, as shown at block 250. The process then returns to block 200, and the outcome and other attributes of the call are added to call-history table 102. Administrative workstation 20 then repeats the operations for modeling the performance data, identifying problems, and determining optimum configurations for proposed calls, as described above.

Thus, the example embodiment provides a system, method, and program product which use historical data, a modeling algorithm, and a decision tree or other model to help identify opportunities for improving video network reliability. In one aspect, the example embodiment provides guidance for diagnosing problems in video networks. In another aspect, the example embodiment provides guidance in the process of configuring video networks for specific video calls. The guidance provided by the example embodiment is frequently more effective than that provided by earlier diagnostic approaches like personal intuition.

Alternative embodiments of the invention include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic and/or optical carriers.

Although an example embodiment has been described in detail, the present invention contemplates a wide variety of video network standards and architectures, modeling algorithms, training-set data structures, call-history data structures, etc. It should therefore be understood that many details may be changed in alternative embodiments without departing from the scope and spirit of the invention.

The scope of the invention is therefore not limited to the particulars of the illustrated embodiments or implementations but is defined by the appended claims.

What is claimed is:

1. A method for modeling video conferencing network reliability, the method comprising:

obtaining historical data for multiple video conferences;

storing said historical data in a call history table, said historical data including video conferencing equipment vendor or model identification information;
executing a modeling algorithm that produces a model representing the historical data, which includes executing a decision tree algorithm;
analyzing the model to identify characteristics associated with undesirable outcomes for the video conferences;
configuring a video conferencing network to avoid at least one of the identified characteristics associated with undesirable outcomes; and
conducting a new video conference with the video conferencing network configured to avoid at least one of the identified characteristics associated with undesirable outcomes.

2. The method of claim 1, wherein the operation of executing a decision tree algorithm comprises executing an ID3-based algorithm.

3. The method of claim 1, further comprising:
updating the historical data to create new historical data that includes values representing characteristics of the new video conference;
executing the modeling algorithm to produce a new model representing the new historical data;
analyzing the new model to produce a result; and
reconfiguring the video conferencing network according to the result.

4. The method of claim 1, further comprising:
evaluating the model to determine whether the model provides a desired level of efficacy; and
in response to determining that the model does not provide a desired level of efficacy, using a different modeling algorithm to produce a different model.

5. The method of claim 1, wherein:
the method further comprises building a training set from the historical data;
the operation of executing the modeling algorithm comprises applying the modeling algorithm to the training set; and
the operation of analyzing the model comprises:
deriving a rule set from the model; and
analyzing the rule set to identify the characteristics associated with undesirable outcomes for the video conferences.

6. The method of claim 5, wherein:
the historical data includes attribute values for attributes of each video conference and an outcome value representing an outcome for each video conference; and
the operation of applying the modeling algorithm to the training set comprises:
using the outcome values as categorical attributes for the modeling algorithm; and
using the attribute values as non-categorical attributes for the modeling algorithm.

7. The method of claim 5, wherein:
the operation of obtaining historical data for multiple video conferences comprises obtaining a first endpoint identifier, a first endpoint vendor, a second endpoint identifier, a second endpoint vendor, and an outcome value for the multiple video conferences;
the operation of building a training set comprises including the first endpoint identifier, the first endpoint vendor, the second endpoint identifier, the second endpoint vendor, and the outcome value for the multiple video conferences in the training set; and
the operation of executing the modeling algorithm comprises using the first endpoint identifier, the first endpoint vendor, the second endpoint identifier, the second endpoint vendor, and the outcome value for the multiple video conferences to produce the model.

8. The method of claim 5, wherein:
the training set includes values representing a first set of attributes; and
the method further comprises:
evaluating the model to determine whether the model provides a desired level of efficacy;
in response to determining that the model does not provide a desired level of efficacy, building a different training set that includes a different set of attributes; and
applying the modeling algorithm to the different training set to produce a different model.

9. A computer storage medium storing instructions, which when executed by a computing device, causes the computing device to perform functions comprising:
obtaining historical data for multiple video conferences;
storing said historical data in a call history table, said historical data including vendor or model identification information; and
executing a modeling algorithm that produces a model representing the historical data, which includes executing a decision tree algorithm;
analyzing the model to identify characteristics associated with undesirable outcomes for the video conferences;
configuring a video conferencing network to avoid at least one of the identified characteristics associated with undesirable outcomes; and
conducting a new video conference with the video conferencing network configured to avoid at least one of the identified characteristics associated with undesirable outcomes.

10. The computer storage medium of claim 9, wherein the functions further comprise:
outputting results that reveal at least one of the opportunities for improving reliability of the video conferencing network, such that a user can reconfigure the video conferencing network, based on the results, to improve reliability of the video conferencing network.

11. The computer storage medium of claim 9, wherein the functions further comprise:
analyzing the model to identify the one or more opportunities for improving reliability of the video conferencing network; and
automatically reconfiguring the video conferencing network, based on the identified opportunities, to improve reliability of the video conferencing network.

12. The computer storage medium of claim 9, wherein:
the executing the decision tree algorithm comprises executing an ID3-based algorithm.

13. The computer storage medium of claim 9, wherein the functions further comprise:
updating the historical data to create new historical data that includes values representing characteristics of a new video conference;
executing the modeling algorithm to produce a new model representing the new historical data;
analyzing the new model to produce a result; and
reconfiguring the video conferencing network according to the result to improve reliability of the video conferencing network.

14. The computer storage medium of claim 9, wherein the functions further comprise:
building a training set from the historical data;
executing the modeling algorithm by applying the modeling algorithm to the training set; and deriving a rule set from the model, such that the one or more opportunities for improving reliability of a video conferencing network can be identified with the rule set.

15. The computer storage medium of claim 14, wherein:
the historical data includes attribute values for attributes of each video conference and an outcome value representing an outcome for each video conference;
the modeling algorithm uses the outcome values as categorical attributes; and
the modeling algorithm uses the attribute values as non-categorical attributes.

16. The computer storage medium of claim 14, wherein the functions further comprise:
obtaining a first endpoint identifier, a first endpoint vendor, a second endpoint identifier, a second endpoint vendor, and an outcome value for the multiple video conferences;
storing in the training set the first endpoint identifier, the first endpoint vendor, the second endpoint identifier, the second endpoint vendor, and the outcome value for the multiple video conferences; and
using, by the modeling algorithm, the first endpoint identifier, the first endpoint vendor, the second endpoint identifier, the second endpoint vendor, and the outcome value for the multiple video conferences to produce the model.

17. A data processing system for modeling video conferencing network reliability, the data processing system comprising:
one or more processing units; and
a computer storage medium storing instructions, which when executed by the one or more processing units, causes the one or more processing units to perform functions including
obtaining historical data for multiple video conferences;
storing said historical data in a call history table, said historical data including vendor or model identification information; and
executing a modeling algorithm that produces a model representing the historical data, which includes executing a decision tree algorithm;
analyzing the model to identify characteristics associated with undesirable outcomes for the video conferences;
configuring a video conferencing network to avoid at least one of the identified characteristics associated with undesirable outcomes; and
conducting a new video conference with the video conferencing network configured to avoid at least one of the identified characteristics associated with undesirable outcomes.

* * * * *